April 7, 1970   ZENJIRO SEKI   3,504,927
BABY WALKER
Filed June 18, 1968   2 Sheets-Sheet 1
FIG_1_
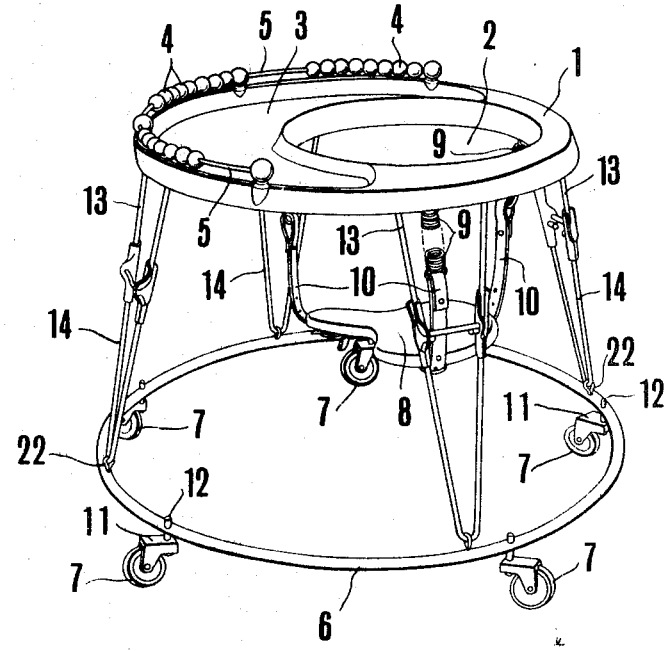
FIG_2_
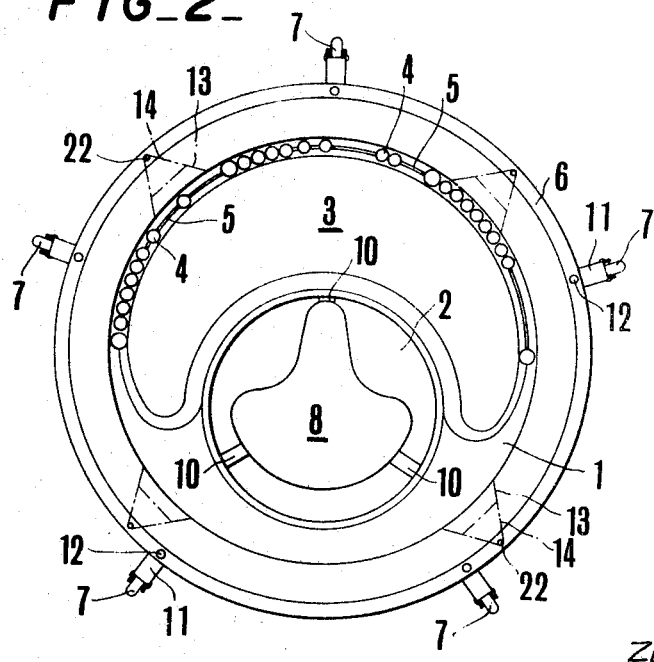
INVENTOR
ZENJIRO SEKI

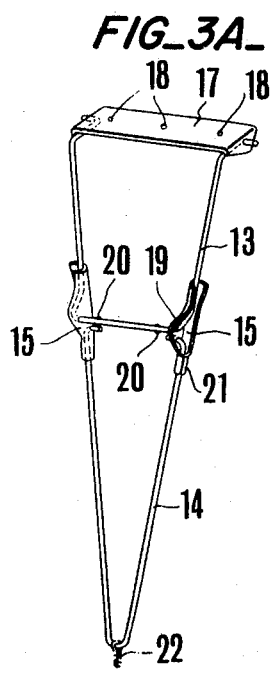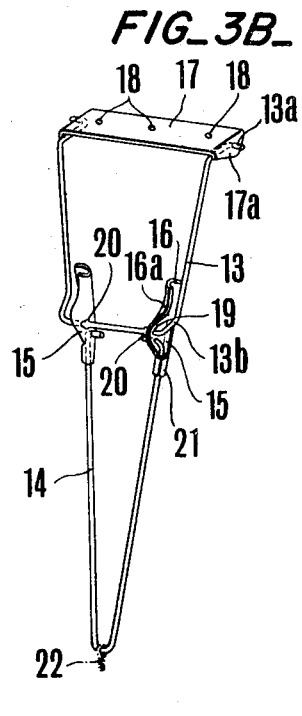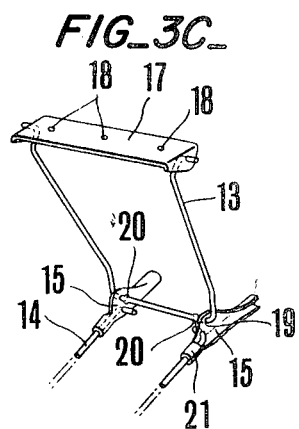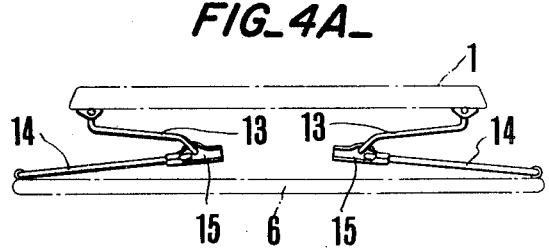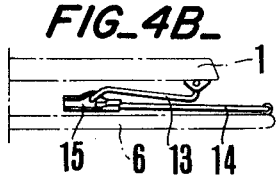

United States Patent Office 3,504,927
Patented Apr. 7, 1970

3,504,927
BABY WALKER
Zenjiro Seki, Tokyo, Japan, assignor to Showa Motsuku
Kaisha, Motoichi Tsukui, and Hoshimago Industry, Co.,
Ltd., Tokyo, Japan, and Stuart L. Whitehouse, Vancouver, British Columbia, Canada
Filed June 18, 1968, Ser. No. 737,931
Claims priority, application Japan, Apr. 10, 1968,
43/29,208
Int. Cl. B62b 7/10
U.S. Cl. 280—87.05    5 Claims

ABSTRACT OF THE DISCLOSURE

A collapsible baby walker comprising a supporting plate, a seat plate, a base frame with castered wheels, and a plurality of legs that can be folded. The baby walker has additional provisions for facilitating feeding the baby and instructing him in calculation.

---

The present invention relates to baby walkers, and more particularly the invention is concerned with collapsible baby walkers.

Baby walkers known in the art that have hitherto been in use for training babies in walking have a disadvantage in that they are as bulky when not in use as when in use because the legs connecting the supporter plate for hanging the seat plate for holding the body of a baby to the base frame cannot be folded. Inconveniences have thus been experienced in transporting or storing baby walkers of the prior art.

Several proposals have been made to obviate this disadvantage. In one type of baby walkers known in the art, a baby walker of the knock-down system has been manufactured in which the supporter plate, the base frame and the legs can be disassembled when not in use and assembled before being used. However, a baby walker of this type also has a disadvantage in that the operation of assembling and disassembling the parts is troublesome, so that it does not lend it self to practical use.

The present invention obviates all the disadvantages of prior art baby walkers described above.

Accordingly, an object of the present invention is to provide a novel baby walker that can be collapsed and restored to is original condition readily and quickly without detaching the legs from the supporter plate and the base frame.

Another object of the invention is to provide a baby walker in which the upper surface of the supporter plate on the front side is recessed so that the supporter table can serve as a table for feeding the baby, and in which a plurality of balls slidably mounted on a wire and serving as a calculating instrument are disposed on the supporter plate as an aid in instructing the baby in calculation.

According to the invention, there is provided a baby walker comprising a supporter plate provided with an opening for inserting the body of a baby therethrough and a recessed surface on the plate, a seat plate suspended from said supporter plate, a base frame with a plurality of castered wheels, a plurality of legs connecting said supporter plate to said base frame, and a plurality of balls slidably mounted on a wire disposed on the supporter plate, such baby walker being characterized in that said legs each consist of an upper leg portion substantially in the form of a letter U, a lower leg portion substantially in the form of a letter V, and a plurality of connecting members for foldably connecting said U-shaped upper leg portion to said V-shaped lower leg portion, the upper end portions of two members of said V-shaped lower leg portion being firmly secured to said plurality of connecting portions and the lower end portions of vertical members of said U-shaped upper leg portion being pivotally connected to the folding portions of said plurality of conecting members, the two members of said V-shaped lower leg portion being resilient and normally urged away from each other.

To enable the invention to be clearly understood, a preferred embodiment thereof will now be described by way of example with reference to the accompanying drawings, in which:

FIG. 1 is a perspective view showing a baby walker as a whole according to this invention;

FIG. 2 is a plan view, with certain parts being shown schematically, of the baby walker shown in FIG. 1;

FIGS. 3A, 3B and 3C are perspective views showing, in sequence, the manner in which the leg of the baby walker is folded; and FIGS. 4A and 4B are schematic front views of a baby walker according to this invention, showing, in sequence, the manner in which the legs are folded.

The baby walker shown in FIG. 1 comprises a supporter plate 1 formed with an opening 2 and a recess 3. A plurality of balls 4 slidably mounted on a wire 5 and serving as a calculating instrument are disposed on the front edge of the supporter plate 1. The baby walker is provided with a base frame 6 with a plurality of castered wheels 7, which is connected to said supporter plate 1 by folding legs subsequently to be described. Suspended from the supporter plate 1 by coil springs 9 and belts 10 connected to said coil springs is a seat plate 8 which is disposed below the opening 2 in the supporter plate 1 for inserting the body of a baby. Each said castered wheel 7 is mounted for free rotation on a support frame 11 which is pivotally connected to the base frame 6 by a pin 12.

Each said leg connecting the supporter plate 1 to the base frame 6 consists of an upper leg portion 13 substantially in the form of a letter U, a lower leg portion 14 substantially in the form of a letter V, and a plurality of connecting members 15 for foldingly connecting said two leg portions 13 and 14 together. Said connecting members 15 each have an upper side portion 16 which is shaped substantially in the form of a trough for holding one of the lower end portions of vertical members of the U-shaped upper leg portion 13. One side surface 16a of the upper side portion 16 has an increasingly smaller width in going toward the lower end. Each said connecting member 15 is formed with an opening 19 for inserting the base member of the U-shaped upper leg portion 13 therein and holding the same for pivotal motion. The connecting members 15 are firmly secured at their lower ends to the upper end portions of the two members of the V-shaped lower leg portion 14 so that the two members of the V-shaped lower leg portion 14 can be urged toward each other at their upper ends to reduce the distance between them against the biasing force of the resilient two members of the lower leg portion 14. 17 is a mounting plate for the upper leg portion 13 which is formed at opposite ends thereof with bent portions 17a each formed with an opening for receiving therein and pivotally connecting one of the upper end portions of the vertical members of the U-shaped upper leg portion 13. The lower end portions of the vertical members of the U-shaped upper leg portion 13 are slightly curved so that the upper and lower leg portions 13 and 14 can be accurately aligned and maintained firmly connected together. The mounting plate 17 is formed with threaded openings 18 for securing the same to the supporter plate 1 with screws. The opening 19 formed in the connecting member 15 for passing the base member of U-shaped upper leg portion 13 is displaced from the direction of extension of the lower leg portion 14 a distance corresponding to the curve of the lower opposite end portions 13b of the upper leg portion 13. The base member of the U-shaped upper leg portion 13 is formed with a pair of projections 20 serving as stoppers for limiting the inward displacement of the two members of the V-shaped lower leg portion 14 when the two members are urged toward each other against the biasing force of the lower leg portion to reduce the distance between them. Each connecting member 15 is formed with an embracing portion 21 at its lower end for restraining the lower leg portion 14 against rotation. 22 is a metal member for pivotally connecting the lower leg portion 14 to the base frame 6.

Preferably, the supporter plate 1 is formed of a hard, tough and durable synthetic resin of any material.

Having the construction as aforementioned, the baby walker according to this invention can be collapsed as shown in FIG. 4B when not in use by urging the two members of the V-shaped lower leg portion 14 toward each other so as to thereby disengage the lower ends of vertical members of the U-shaped upper leg portion 13 from the holding portions 16 of the connecting members 15 and moving the upper leg portion 13 downwardly in pivotal motion so as to lay the upper leg portion 13 over the lower leg portion. The baby walker of this invention can thus be handled readily in transporting and storing the same.

The baby walker in a collapsed position can be restored to its normal position my merely pulling the supporter plate 1 upwardly. The upward force applied to the supporter plate portion 13 to bear against the inclined side surfaces 16a of the holding portions 16 of connecting members 15 to thereby automatically move the upper ends of the two members of the V-shaped lower leg portion away from each other. The vertical members of the U-shaped upper leg portion 13 can thus be received in the holding portions 16 of connecting members 5, bringing the baby walker to a normal upright position. It is to be noted that when in an upright position the resilience of the lower leg portion 14 permits the upper leg portion 13 to be held firmly in a stable manner, so that the leg as a whole is very sturdy and free from the danger of buckling. The baby walker according to this invention has additional provisions for making it attractive as a companion of a baby. The provision of a calculating instrument on the supporter plate 1 permits the baby walker of this invention to be used as a toy by a baby. The recess 3 on the supporter plate 1 is effective in preventing food and drinks from spilling from a plate when the baby is fed while sitting on the seat plate, thereby facilitating the use of the supporter plate as a table for feeding the baby. Combined with the ease with which the baby walker can be readily and quickly collapsed when it is not in use and the safety with which it can be used in training the baby in walking, these additional features greatly increase the practical value of the baby walker of this invention.

What is claimed is:

1. A baby walker comprising: a supporter plate provided with an opening for inserting the body of a baby therethrough; a seat plate suspended from said supporter plate; a base frame with castered wheels; and a plurality of legs connecting said supporter plate to said base frame, said plurality of legs each consisting of a substantially U-shaped first leg portion, a substantially V-shaped second leg portion and a plurality of releasable connecting members pivotally connecting said first leg portion to said second leg portion for holding said portions in rigid alignment and selectively operable to release said portions from rigid alignment to permit rotation of one portion with respect to the other about said connecting member, said U-shaped portion of each leg being the upper portion of a leg and the V-shaped portion being the lower portion, and said connecting members each including an elongated rigid member having a substantially open-sided trough-shaped holding section releasably engageable with the lower end portion of one of the vertical members of the U-shaped upper leg portion, a second section firmly secured to the upper end portion of one of the two members of the V-shaped lower leg portion, and having a hole intermediate said sections and through which the horizontal part of the U-shaped leg portion slidably passes, whereby the lower ends of the vertical members of the U-shaped upper leg portions are connected to the connecting members for rotation relative thereto only when said first sections are not engaged with the vertical portions thereof, and the upper end portions of the two members of the V-shaped lower leg portion are firmly secured to the connecting members, the resiliency of the V-shaped portions normally holding said first sections in engagement with the vertical members of the U-shaped portions.

2. A baby walker comprising in combination: a supporter plate provided with an opening for inserting the body of a baby therethrough; a seat plate suspended from said supporter plate; a base frame having a plurality of wheels secured thereto; and a plurality of collapsible legs connecting said supporter plate to said base frame, each leg including a first pair of spaced apart upper leg members pivotally secured to said supporter plate, a second pair of spaced apart lower leg members pivotally secured to said base frame, and connecting means rigidly secured to one of said pair of members and pivotally and slidably secured to said other pair of members near the outer ends of said pairs of members, said connecting means having a first position on said other pair of members for connecting said pairs of members in rigid alignment when the walker is in elevated condition and being slidable to a second position on said other pair of members to permit relative rotation between said pairs of members to permit collapsing of the baby walker.

3. Apparatus as defined in claim 2 wherein the leg members of one of said first pair of members are interconnected at their remote ends to form a substantially U-shaped member, the leg members of said second pair are interconnected at their ends adjacent to said base frame, and wherein said connecting means includes first and second connecting members rigidly secured to the outer ends of the leg members of said second pair and are slidable on the horizontal portion of said U-shaped member, said connecting members being in the form of elongated tubular members having outer open side portions for selective release of the leg members of said first pair.

4. The apparatus of claim 2 wherein said first set of leg members are interconnected at their remote ends by a straight interconnecting section and said connecting means includes first and second connecting members secured to the ends of the leg members of said second pair and pivotally coupled to said interconnecting section, said connection members being urged into engagement with the downwardly extending portions of said first pair of members due to the spring action of said second pair of members.

5. The apparatus of claim 3 wherein said second pair of members form a first substantially V-shaped member and wherein said U-shaped member and said V-shaped member when held in rigid alignment form an A-shaped member having its apex at the base frame.

References Cited

UNITED STATES PATENTS

| | | | |
|---|---|---|---|
| 581,486 | 4/1897 | Monkiewicz | 108—145 |
| 1,141,123 | 6/1915 | Knight | 272—70.3 |
| 1,223,707 | 4/1917 | Lyon | 272—70.3 |
| 1,357,643 | 10/1920 | Gordon | 297—5 |
| 1,326,921 | 1/1920 | Dzimitowicz | 297—5 |
| 1,342,518 | 6/1920 | Webber | 280—87.05 |
| 1,688,922 | 10/1928 | Drinosky | 297—5 |
| 2,667,206 | 1/1954 | Welsh | 280—87.05 |

LEO FRIAGLIA, Primary Examiner

U.S. Cl. X.R.

272—70.3; 280—36; 297—5